United States Patent [19]

Leidinger

[11] Patent Number: 5,161,610
[45] Date of Patent: Nov. 10, 1992

[54] EVAPORATION HEAT EXCHANGER, ESPECIALLY FOR A SPACECRAFT

[75] Inventor: Bernhard Leidinger, Weyhe-Leeste, Fed. Rep. of Germany

[73] Assignee: ERNO Raumfahrttechnik GmbH, Bremen, Fed. Rep. of Germany

[21] Appl. No.: 713,802

[22] Filed: Jun. 12, 1991

[30] Foreign Application Priority Data

Jun. 29, 1990 [DE] Fed. Rep. of Germany ....... 4020755

[51] Int. Cl.[5] .............................................. F25D 7/00
[52] U.S. Cl. ...................................... 165/41; 165/110; 165/154; 165/911; 62/100; 62/268; 122/40
[58] Field of Search ................ 165/154, 41, 110, 911; 122/40, 41, 39; 62/100, 268

[56] References Cited

U.S. PATENT DOCUMENTS

| | | | |
|---|---|---|---|
| 2,958,482 | 11/1960 | Summers, Jr. | 62/100 |
| 3,986,551 | 10/1976 | Kilpatrick | 165/154 |
| 4,349,723 | 9/1982 | Swiatosz | 122/40 |

OTHER PUBLICATIONS

Article entitled: "Shuttle Orbiter Flash Evaporator", by J. R. Nason et al., published by the American Society of Mechanical Engineers in 1979.

*Primary Examiner*—Albert W. Davis, Jr.
*Attorney, Agent, or Firm*—W. G. Fasse

[57] ABSTRACT

An active cooling circuit through which cooling liquid circulates, is connected to an evaporation heat exchanger for cooling said cooling liquid when it has begun to warm. For this purpose, a housing encloses an evaporation chamber into which an evaporation fluid, such as water, is sprayed whereby the heat needed for the evaporation cools the cooling liquid passing through a gap between an inner and an outer wall forming said housing. The active cooling circuit passes through the gap in which eddy bodies are arranged in such positions relative to the normal flow direction of the cooling liquid through the gap to cause eddy currents in the cooling liquid flowing through the gap for an improved heat exchange. The discharge for the evaporated fluid is located at the same housing end where the spray nozzles for the injection of the evaporation fluid are located.

17 Claims, 3 Drawing Sheets

EVAPORATION HEAT EXCHANGER, ESPECIALLY FOR A SPACECRAFT

FIELD OF THE INVENTION

The invention relates to an evaporation heat exchanger, especially for use in a spacecraft, wherein at least one active liquid cooling circuit is connected to the heat exchanger for removing heat out of a spacecraft, for example.

BACKGROUND INFORMATION

An article entitled "Shuttle Orbiter Flash Evaporator" by J. R. Nason et al. and published by the American Society of Mechanical Engineers in 1979 describes a flash evaporator in which the cooling liquid that needs to be cooled, circulates through a gap between two housing walls enclosing an evaporation chamber into which an evaporation fluid is introduced, for example, by spraying. Thus, the cooling liquid that needs to be cooled down is in thermal contact with the evaporation fluid that is being evaporated in the evaporation chamber. The housing is preferably a cylindrical container and the walls forming the housing are constructed as so-called cores which are grooved in the axial direction as shown in FIG. 2 of the above mentioned article. The cooling liquid that needs to be cooled, flows through the ring gap which has a corrugated cross-sectional configuration as shown in FIG. 2 of the article. The cooling liquid that needs to be cooled and which circulates in one or several active cooling circuits, is brought into thermal contact with the evaporation fluid by passing the cooling liquid to be cooled through the corrugated housing walls. The evaporation fluid is injected through one or more injection nozzles to form a jet of evaporation fluid droplets inside of the evaporation chamber of the heat exchanger. The droplets contact the inner surfaces of the housing walls forming the evaporation chamber, whereby the droplets take up heat from the liquid to be cooled and evaporate. The resulting vapor or steam is removed through a discharge opening in the evaporator housing and discharged into the environment of the spacecraft.

Using a device of the type described above under operating conditions free of gravity, and under different acceleration conditions during the starting and landing of the spacecraft, poses a basic problem of how to bring the evaporation fluid and the liquid to be cooled that flows through its cooling circuit, into an efficient heat exchange contact with each other. It is important to use the evaporation fluid as efficiently as possible to convert it substantially completely into the vapor phase, because the evaporation fluid must be carried by the spacecraft at the expense of other payloads. In order to improve the heat transfer between the cooling liquid that needs to be cooled on the one hand and the evaporation fluid on the other hand, the flash evaporator described by Nason et al. uses the above mentioned grooves in the gap between the two coaxially arranged cylindrical housing walls. The grooves are made of corrugated sheet metal formed into a cylinder member held between the cylinder walls forming the housing by brazing the corrugated cylinder member to the housing walls.

OBJECTS OF THE INVENTION

In view of the foregoing it is the aim of the invention to achieve the following objects singly or in combination:

to improve the heat exchange efficiency in an evaporation heat exchanger of the above described type in such a way that the discharge of evaporation fluid that has not yet been evaporated is further reduced or minimized;

to assure an effective eddying of the cooling liquid that needs to be cooled as it flows through the heat exchange gap in the evaporator housing; and to construct the evaporator housing in such a way that the evaporated fluid is discharged from the evaporation chamber near that end of the chamber where the evaporation fluid is injected into the chamber.

SUMMARY OF THE INVENTION

An evaporation heat exchanger of the flash evaporation type is characterized according to the invention in that flow eddying bodies are arranged inside a ring gap between the housing walls and that the eddying bodies have at least one side or a longitudinal axes extending at an angle other than zero relative to the flow direction of the liquid to be cooled through the gap. Further, the present evaporator is characterized in that the outlet opening or openings for the evaporated fluid are located in a wall of the evaporator housing either near one end where the inlet for the introduction of the evaporation fluid is located, or at the chamber end opposite to the inlet end for the evaporation fluid. Both versions are effective.

The arrangement of the eddying bodies inside the ring gap of the evaporation housing assures an intensive eddying of the cooling liquid that needs to be cooled, whereby an improved intermixing of the cooling liquid is assured. More specifically, cold portions of the liquid to be cooled close to the wall surfaces are intensively mixed with higher temperature portions of the cooling liquid away from the walls in the gap so that an intimate contact of all the liquid portions to be cooled with the wall surfaces inside the gap is assured, whereby an intensive or rather improved cooling efficiency is achieved.

By machining the eddy bodies directly and integrally, either into the outer surface zone of the inner housing wall, or into the inner surface zone of the outer housing wall forming the flow gap for the liquid to be cooled, a very efficient heat transfer is achieved between the liquid to be cooled and the the housing walls. However, it is preferred to machine the eddy bodies into the outer surface of the inner housing wall since the inner housing wall is in direct contact with the evaporating fluid in the evaporation chamber. Another advantage of machining the eddy bodies directly into the radially outer surface of the inner housing wall is seen in the increase of the heat capacity of the entire structure of the evaporator.

The increase in the heat capacity in turn has the advantage that an overall uniform temperature characteristic as a function of time, is achieved for the cooling liquid circuit in which the liquid to be cooled circulates for cooling components of the spacecraft. A uniform temperature characteristic over time is especially important because the cool down process is so planned that it takes place near the solidifying temperature of the cooling liquid. Avoiding negative temperature peaks is important, even if these peaks only have a short duration. Their falling below the solidifying temperature could result in a blocking of the cooling liquid circulating circuit initially only at a localized point, but due to a consequential reaction a total blocking of the cooling liquid circulating circuit could occur by the formation of a plug if the cooling liquid should solidify.

The integral formation of the eddying body in the surface of the inner housing wall, for example, by a turning operation on a lathe, or by a milling operation, or even by a simple sawing operation has the further manufacturing advantage that the above mentioned brazing or hard soldering operation is avoided. Avoiding a brazing or hard soldering operation has two advantages. First, it reduces the manufacturing costs substantially. Second, problems caused by the heat required for the brazing are avoided. The last mentioned advantage, namely avoiding brazing temperatures, is especially important because the brazing temperatures are close to the melting temperatures of the sheet metal of which the housing wall sections are made, such as high strength aluminum alloys. The conventional brazing requires the maintaining of highly precise soldering or brazing temperatures in order to maintain the dimensional stability of the housing components. If the precise dimensions of the corrugated sheet metal member are not maintained in the conventional evaporator, the corrugated member might not fit into the relatively narrow gap between the outer and inner evaporator housing walls.

The above mentioned embodiment of the invention in which the discharge opening or openings for the evaporated fluid are located at the same end of the evaporation chamber, as the inlet valve and/or inlet nozzle for the evaporation fluid, has the advantage that the discharge of not yet evaporated fluid is substantially reduced. As a result, the evaporation fluid is substantially completely evaporated before it is discharged. This improved efficiency in the evaporation is due to the guiding of the outflowing vapor or steam in such a way that the fluid being vaporized must make a U-turn to travel opposite the injection direction of the evaporation fluid. By combining this U-turn flow pattern of the evaporation fluid with the further feature of the invention that the liquid to be cooled flows through channels or conduits or gaps in the heat cover and in the bottom of the cylindrical evaporation housing, the invention further improves the manufacturing of such an evaporator housing because it avoids the need for a heated baffle plate that is required in the prior art in order to retain droplets that may be entrained in the vapor and would be carried directly out through a discharge opening without such a baffle plate. The invention avoids such a baffle plate.

BRIEF DESCRIPTION OF THE DRAWINGS

In order that the invention may be clearly understood, it will now be described, by way of example, with reference to the accompanying drawings, wherein.

DESCRIPTION OF PREFERRED EXAMPLE EMBODIMENTS AND OF THE BEST MODE OF THE INVENTION

Figure 1:
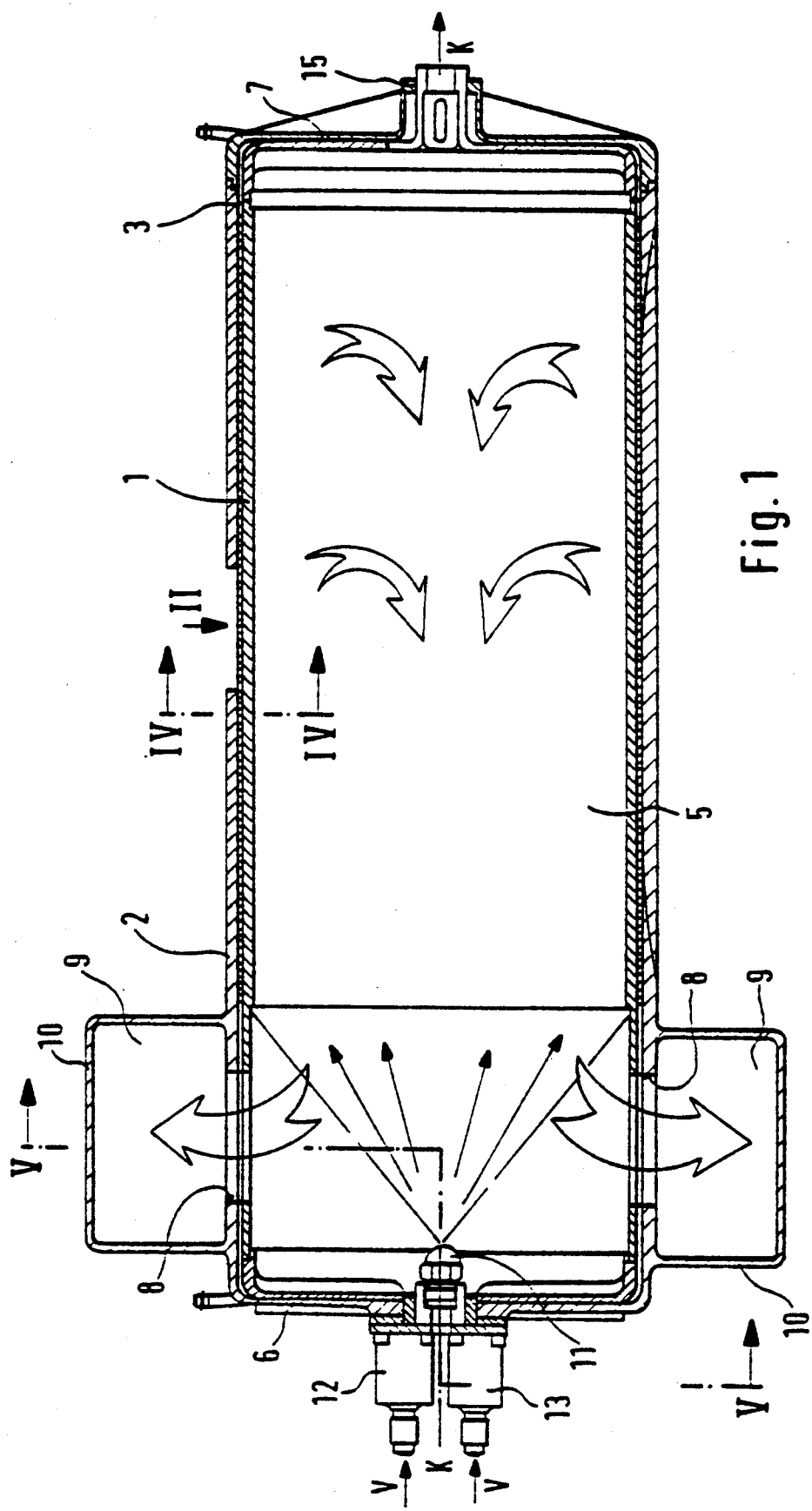
FIG. 1 shows a longitudinal section through an evaporation chamber according to the invention.

The sectional view of FIG. 1 shows an evaporator housing H enclosing a cylindrical evaporation chamber 5 by means of a cylindrical inner housing wall 1 and an outer cylindrical housing wall 2. The housing walls 1 and 2 are spaced from each other to form a flow gap 3 through which the cooling liquid to be cooled, flows in a direction from an inlet to an outlet of the evaporator so that the flow gap 3 forms part of a cooling liquid circulating circuit. Several such circuits may be cooled by the same evaporator. Cooling liquid to be cooled enters into the gap 3 through a cooling liquid inlet 14 and through flow ducts in a head cover 6 of the housing H. The cooled liquid exits from the gap 3 through flow ducts in a bottom plate 7 leading into an exit port 15. The arrows K indicate the flow direction of the cooling liquid to be cooled. At least one temperature sensor 15a is arranged to sense the outlet temperature of the now cooled, cooling liquid. According to the invention eddying bodies 4 are arranged in the ring gap 3 for eddying the cooling liquid as it flows through the ring gap 3. Preferably, the eddying bodies 4 are formed as an integral component of the outer surface of the inner cylinder wall 1. The shape of these eddying bodies 4 will be described below with reference to FIGS. 2, 3, and 6. The left-hand or inlet end of the evaporation chamber 5 is closed by said head cover 6. The right-hand end or bottom of the chamber 5 is closed by said bottom plate 7. The head cover 6 and the bottom plate 7, each has two shells for forming said ducts inside the head cover 6 and inside the bottom plate 7. These ducts communicate with the gap 3 so that the liquid to be cooled also flows through the head cover and the bottom plate. These ducts in the head cover 6 and the bottom plate 7 are not visible in FIG. 1 since they are located outside of the section plane.

Figure 5:
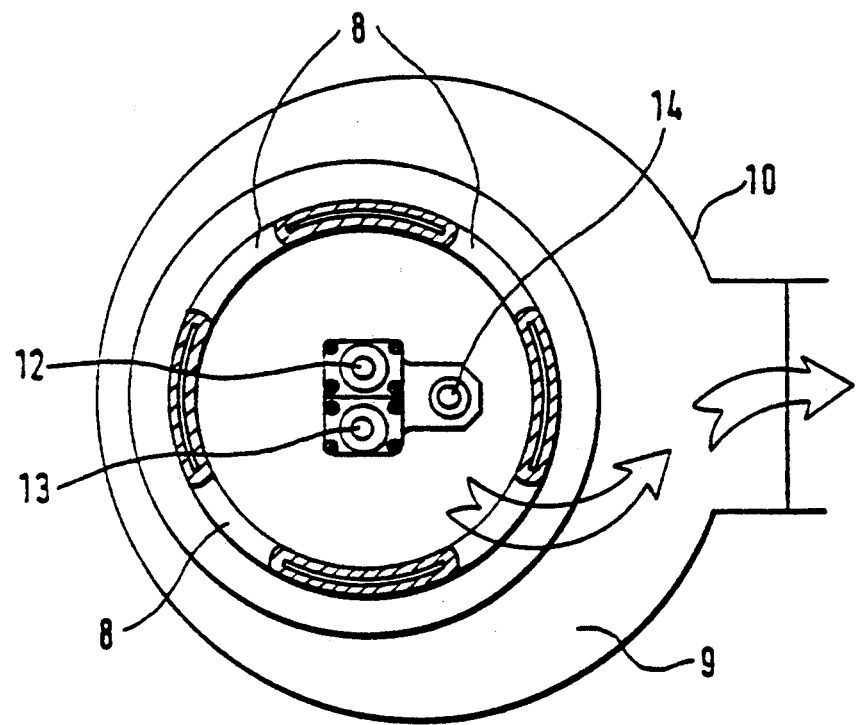
FIG. 5 is a sectional view along section line V—V in FIG. 1 to show the position of the evaporation fluid inlet and of the discharge exit for the evaporated fluid.

The zone of the evaporator housing H next to the head cover 6 is surrounded by a vapor discharge housing 10 enclosing a ring space 9 communicating with the evaporation chamber 5 through first discharge openings 8 for discharging the evaporated fluid indicated by the arrows A1 through an exhaust 10a in the exhaust housing 10, please see FIG. 5 showing that the exhaust housing 10 is arranged excentrically relative to the cylindrical walls 1 and 2 enclosing the evaporation chamber 5.

Referring further to FIGS. 1 and 5 in conjunction, an injection nozzle 11 for the evaporation fluid, for example water, is arranged in the head cover 6. The injection nozzle 11 reaches into the evaporation chamber 5 in such a manner and the injection cone angle $\alpha$ is selected in such a way that the outer envelope 11a of the injection cone does not reach the exit or discharge openings 8. Preferably, the angle $\alpha$ is about 80° as shown in FIG. 1. In other words, the exit openings 8 are located outside the outer envelope 11a of the injection cone to prevent evaporation fluid that has not yet been evaporated to pass out through the discharge openings 8. The fluid to be evaporated is supplied, as indicated, by the arrows V in FIG. 1 through two control valves 12 and 13 to the nozzle 11. Two valves 12, 13 are provided for redundancy purposes to maintain the system operational even if one valve should fail. The valves 12 and 13 cooperating with the nozzle 11 form a first inlet for introducing the evaporation fluid such as water into the evaporation chamber 5. The inlet 14 for introducing warmed-up cooling liquid through the head cover 6 into the flow gap 3 is located somewhat off-center with regard to the central longitudinal axis of the chamber 5. The inlet 14 may be a pipe connector coupled to the cooling liquid circulating circuit, not shown. The cooling liquid may, for example, also be water or any other suitable liquid. The cooled liquid outlet 15 in the bottom plate 7 is also a pipe connector coupled to the circulating circuit. The heat sensor 15a senses the temperature of the now cooled cooling liquid at the outlet 15. The respective temperature signal is used for controlling the valves 12 and 13 in a pulsing manner.

Figure 2:
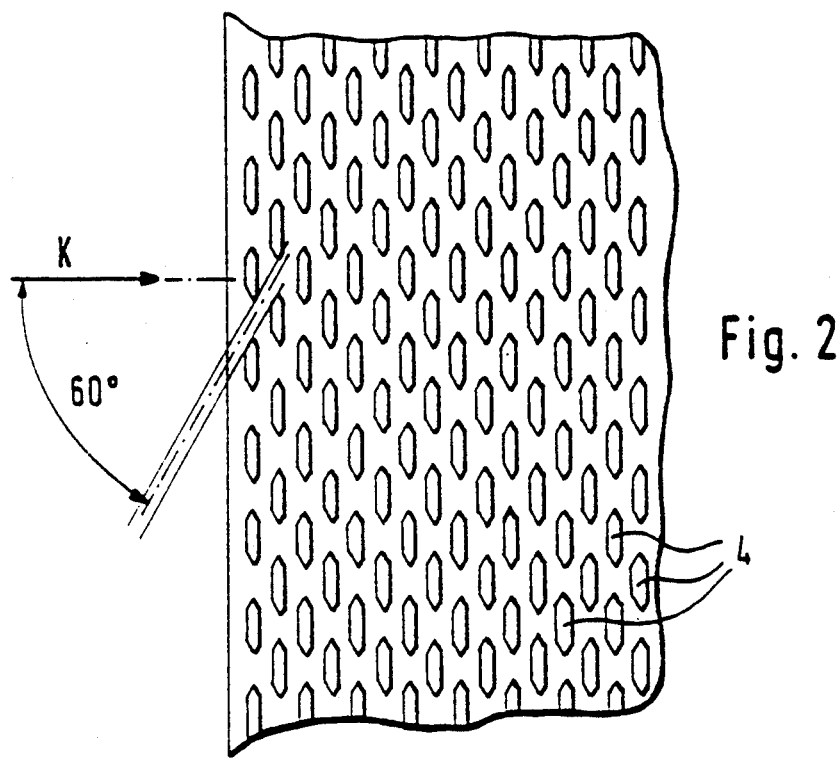
FIG. 2 is a plan view in the direction of the arrow II in FIG. 1 with a portion of the outer evaporator housing wall cut away to show the projected arrangement of the eddying bodies according to the invention on the inner housing wall.
Figure 3:
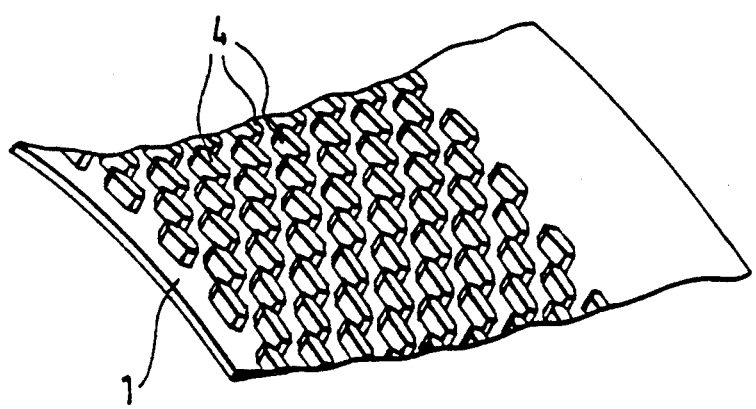
FIG. 3 is a perspective view onto a portion of the outer surface of the inner housing wall.

Referring to FIGS. 2 and 3 the plan view of FIG. 2 shows a plurality of eddy bodies 4 forming an integral part of the inner cylindrical housing wall 1. Each individual eddy body 4 has an elongated hexagonal cross-section with two parallel sides and two tips. The eddy bodies 4 are arranged in a plurality of rings 4a, 4b extending circumferentially around the inner housing wall 1. The eddy bodies 4 in each ring are axially aligned with their longitudinal axis in the circumferential direction. Additionally, the bodies 4 in each ring are circumferentially spaced from each other to form spacings 4c. The arrangement is such, that eddy bodies in one neighboring ring are staggered relative to the eddy bodies in the other neighboring ring so that an efficient eddying is achieved. The eddy bodies 4 are preferably formed as integral elements of the inner housing wall 1 by a machining operation, for example, by a milling operation. Conventionally, without the eddy bodies 4, the cooling liquid to be cooled would flow through the gap 3 in the direction of the arrow K shown in FIG. 2 extending in parallel to the longitudinal axis of the cylinder housing H. However, according to the invention, a substantially more efficient whirling or eddying of the flow is achieved by arranging the eddying bodies 4 as described and so that an angle $\beta$ is formed between the normal flow direction K and the respective slanted short sides of the hexagonal cross-section as shown in FIG. 2. The angle $\alpha$ is, for example, 60° as shown in FIG. 2. The longitudinal axis of each eddy body 4 which extends circumferentially, also extends at a right angle relative to the normal flow direction K. FIG. 3 illustrates perspectively the above mentioned staggering so that the eddy bodies of one ring substantially cover the circumferential spaces 4c between the eddy bodies of a neighboring ring, whereby the cooling liquid is forced to repeatedly eddy around the tips of the individual eddy bodies 4.

Figure 4:
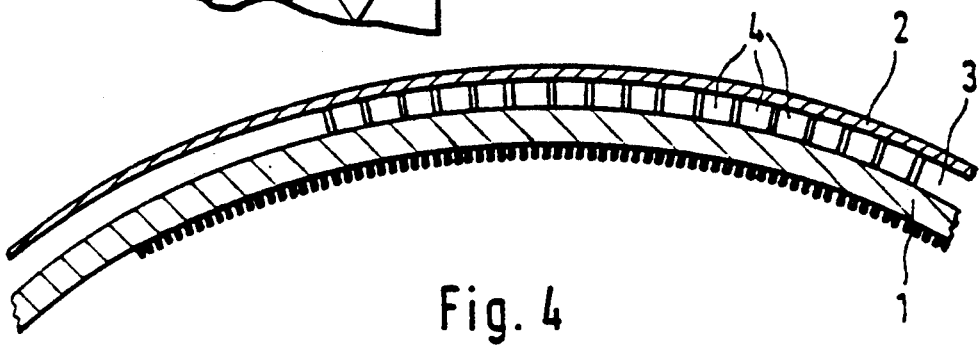
FIG. 4 is a partial sectional view along section line IV—IV through the housing double wall as shown in FIG. 1.

FIG. 4 shows on an enlarged scale a sectional view through the gap 3 between the housing walls 1 and 2 with the eddy bodies 4 located in the gap. The eddy bodies 4 support the outer housing wall 2 on the inner housing wall 1 as best seen in FIG. 4. Additionally, FIG. 4 shows a capillary structure 1a on the inwardly facing surface of the inner housing wall 1. The capillary structure 1a faces into the evaporation chamber 5 and enhances the surface contact between the vapor being formed and the inner housing wall 1.

In operation, the vapor being formed in the chamber 5 is indicated by the arrows A2 indicating that the formed vapors must make a radially inward U-turn in order to exit through the exit openings or ports 8 as indicated by the arrows A1 to be discharged through the discharge 10a shown in FIG. 5. The arrows A2 indicate that the injected cool evaporation fluid flows along the wall of the inner housing 1, and the warmer evaporated fluid flows first radially inwardly and then again axially toward the exit openings 8 and radially out into the discharge ring space 9 as shown by the arrows A1. This flow pattern shown by the arrows A1 and A1 also contributes to the efficiency of the heat exchange.

The cooling liquid to be cooled flows through its respective cooling circulating circuit and travels through the gap 3 shown in FIG. 1 from left to right. More specifically, the cooling liquid to be cooled enters first into the flow ducts of the head cover 6 and is then uniformly distributed into the cylindrical ring gap 3 where the liquid to be cooled is eddied by the eddy bodies 4 until the liquid reaches the bottom plate 7 to flow through the ducts in the bottom plate 7 to the exit opening 15. The above mentioned temperature sensor 15a measures the temperature at the exit opening 15. As soon as the measured temperature exceeds a predetermined upper limit value, this is an indication that the cooling liquid has become too warm and the respective signal is used to activate the valves 12 or 13 to inject evaporation fluid through the nozzle 11 into the evaporation chamber 5. The evaporation fluid is kept in a storage container not shown. The container is connected to the valve inlets 12a and 13a respectively. When the measured temperature at 15a falls below a lower limit value, indicating that the cooling liquid temperature is too low, the injection is stopped by closing the valves 12 or 13. Thus, an intermittent operation is maintained in response to the temperature measured at 15. When the valve 12 or 13 is open, the nozzle 11 sprays the evaporation fluid as a fine mist into the chamber 5, more specifically, onto the capillary inner surface 1a of the housing wall 1 enclosing the chamber 5. The injection direction downstream of the nozzle 11 is indicated by the arrows V within the injection cone 11a.

The evaporation withdraws heat from the cooling liquid travelling in an eddy flow through the gap 3, whereby the heat is transferred through the inner wall 1 of the cylinder housing and to the heat transfer inner surface 1a. Due to this transfer and due to the relatively low pressure inside the evaporation chamber 5 the liquid film on the surface of the capillary structure 1a passes without delay into the vapor phase already at relatively low temperatures. During the phases of an operational cycle when the nozzle 11 does not inject any evaporation fluid into the chamber 5, the pressure in the chamber 5 is below 1 mbar. As evaporation proceeds, the vapor indicated by the arrows A2 increases the pressure in the chamber 5 to a pressure within the range of about 5 to about 10 mbar. The vapor A2 makes the above mentioned U-turn and flows in a direction opposite to the main injection direction to the exit openings 8 and out through the discharge opening 10a as described above.

Due to the fact that the head cover 6 and the bottom plate 7 are each equipped as heat transfer components of the housing H, it is assured that any liquid droplets that have not yet been vaporized, and that may have been entrained by the flowing vapor, impinge upon the inner surfaces of the cover 6 or the end plate 7 so that a further evaporation takes place and practically the entire evaporation fluid in its liquid form is caused to evaporate so that the entire supplied evaporation fluid participates completely in the heat removal.

The time durations of the pauses in an operational cycle which includes an injection time and a pause time, are so selected that the inner surfaces of the chamber 5, including the capillary surface 1a and the inwardly facing surfaces of the cover 6 and of the bottom plate 7 dry out completely before a new injection of evaporation fluid takes place. The capilliary structure 1a of the inner surface of the inner cylinder wall 1 makes sure that a uniform radial distribution of the liquid to be evaporated takes place. The eddy bodies 4 not only influence the flow by forming an eddy flow, these bodies 4 also increase the surface area available for contact with the liquid to be cooled to thereby provide for a more intensive heat removal through the wall 1 and the capillary structure 1a.

Figure 6:
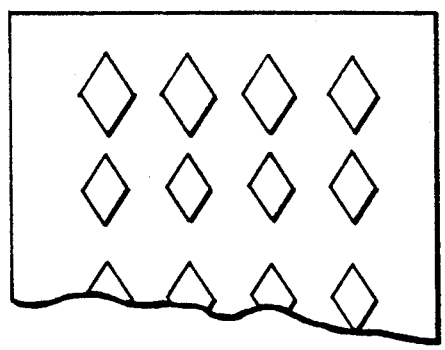
FIG. 6 is a plan view similar to FIG. 2, but showing eddy bodies having a rhombus cross-sectional configuration.

FIG. 6 shows an embodiment with eddy bodies 4' having a rhombus cross-sectional area rather than an elongated hexagonal cross-sectional area as shown in FIGS. 2 and 3. The efficiency and function of the eddy bodies 4a is the same as that of the bodies 4.

Mounting brackets MB or the like are shown in the upper left and right corners of the housing H in FIG. 1.

Although the invention has been described with reference to specific example embodiments, it will be appreciated that it is intended to cover all modifications and equivalents within the scope of the appended claims.

What I claim is:

1. An evaporation heat exchanger, comprising evaporation housing means enclosing an evaporation chamber for evaporating an evaporation fluid in said evaporation chamber, first inlet means for introducing evaporation fluid into said evaporation chamber, first discharge means for discharging evaporated fluid out of said evaporation chamber, said housing means comprising an inner housing wall and an outer housing wall enclosing said inner housing wall with a spacing to form between said inner and outer housing walls a flow gap in which cooling liquid to be cooled flows between said outer and inner housing walls, second inlet means for introducing warmed-up cooling liquid into said flow gap and second discharge means for discharging cooled cooling liquid from said flow gap, whereby a main flow direction (K) is established for said cooling liquid, from said second inlet means to said second discharge means, flow eddying bodies (4) in said flow gap, said flow eddying bodies having a longitudinal axis extending substantially perpendicularly to said main flow direction (K) and at least one side of said flow eddying bodies extending at an angle ($\beta$) other than zero relative to said main flow direction of said cooling liquid for eddying said cooling liquid as it flows through said flow gap, and wherein said first inlet means and said first discharge means are located substantially at the same end of said evaporation housing means, so that said evaporation fluid is caused to follow a flow first axially along an inwardly facing surface of said inner housing wall in said main flow direction, and so that evaporated fluid flows first radially inwardly in said evaporation chamber then axially opposite to said main flow direction toward said first discharge means and then radially out of said first discharge means, whereby said flow eddying bodies with their position in said flow gap in combination with said evaporated fluid flow improve a heat exchange efficiency.

2. The heat exchanger of claim 1, wherein said flow eddying bodies comprise a plurality of eddying elements arranged in rings in said flow gap with a space between neighboring eddying elements of the same ring, whereby said longitudinal axes of said flow eddying bodies extend substantially circumferentially around said inner housing wall.

3. The heat exchanger of claim 2, wherein said eddying elements in any of said rings are staggered relative to eddying elements in at least one neighboring ring of eddying elements.

4. The heat exchanger of claim 1, wherein said flow eddying bodies have a hexagonal cross-section with at least two parallel longitudinal sides.

5. The heat exchanger of claim 1, wherein said flow eddying bodies are machined into an outer surface of said inner housing wall.

6. The heat exchanger of claim 1, wherein said flow eddying bodies are machined into an inner surface of said outer housing wall.

7. The heat exchanger of claim 1, wherein said flow eddying bodies have a rhombus cross-section with at least one side extending at an angle to said flow direction.

8. The heat exchanger of claim 1, wherein said housing walls comprise a head cover and a bottom each having flow passages therein communicating with said flow gap, said second inlet means for said cooling liquid to be cooled and said second discharge means for said cooling liquid being each connected to one of said head cover and said bottom for introducing cooling liquid to be cooled into said gap and for discharging cooled cooling liquid from said gap.

9. The heat exchanger of claim 8, wherein said head cover and said bottom are constructed as heat exchanger components of said evaporation housing means.

10. The heat exchanger of claim 1, wherein said first inlet means comprise spray nozzle means for spraying said evaporation fluid into said evaporation chamber, said spray nozzle means having such an injection cone angle ($\beta$) that an outer envelope of an injection cone of evaporation fluid is directed toward an inner surface of said inner housing wall, and wherein said first exit means for said evaporation fluid is located outside said outer envelope of said injection cone.

11. The heat exchanger of claim 10, wherein said injection cone angle ($\alpha$) is about 80°.

12. The heat exchanger of claim 1, wherein said angle ($\beta$) between said main flow direction (K) and said at least one side of said flow eddying bodies is about 60°.

13. The heat exchanger of claim 1, wherein said flow eddying bodies support said outer housing wall on said inner housing wall.

14. An evaporation heat exchanger comprising evaporation housing means enclosing an evaporation chamber for evaporating an evaporation fluid in said evaporation chamber, first inlet means for introducing evaporation fluid into said evaporation chamber, first discharge means for discharging evaporated fluid out of said evaporation chamber, said housing means comprising an inner housing wall and an outer housing wall enclosing said inner housing wall to form a flow gap in which cooling liquid to be cooled flows between said outer and inner housing walls, second inlet means for introducing warmed-up cooling liquid into said flow gap, second discharge means for discharging cooled cooling liquid from said flow gap, whereby a main flow direction (K) is established for said cooling liquid, from said second inlet means to said second discharge means, flow eddying bodies in said flow gap, said flow eddying bodies having a longitudinal axis extending substantially perpendicularly to said main flow direction and at least one side of said flow eddying bodies extending at an angle ($\beta$) other than zero relative to said main flow direction of said cooling liquid for eddying said cooling liquid as it flows through said flow gap, and wherein said longitudinal axes of said flow eddying bodies extend substantially circumferentially around said inner housing wall for an efficient eddying of said cooling liquid with gaps between neighboring flow eddying bodies.

15. The heat exchanger of claim 14, wherein said first discharge means for discharging evaporated fluid are located in a side wall of said housing means in a position radially spaced from said first inlet means, so that evaporated fluid must make an approximately 90° turn for flowing out of said evaporation chamber.

16. The heat exchanger of claim 14, wherein said first inlet means comprise spray nozzle means for spraying said evaporation fluid into said evaporation chamber, said spray nozzle means having an injection cone angle ($\alpha$) of about 80° for spraying cooling liquid substantially against an inner wall surface of said inner housing wall.

17. The heat exchanger of claim 14, wherein said flow eddying bodies support said outer housing wall on said inner housing wall.

* * * * *